United States Patent Office 3,428,548
Patented Feb. 18, 1969

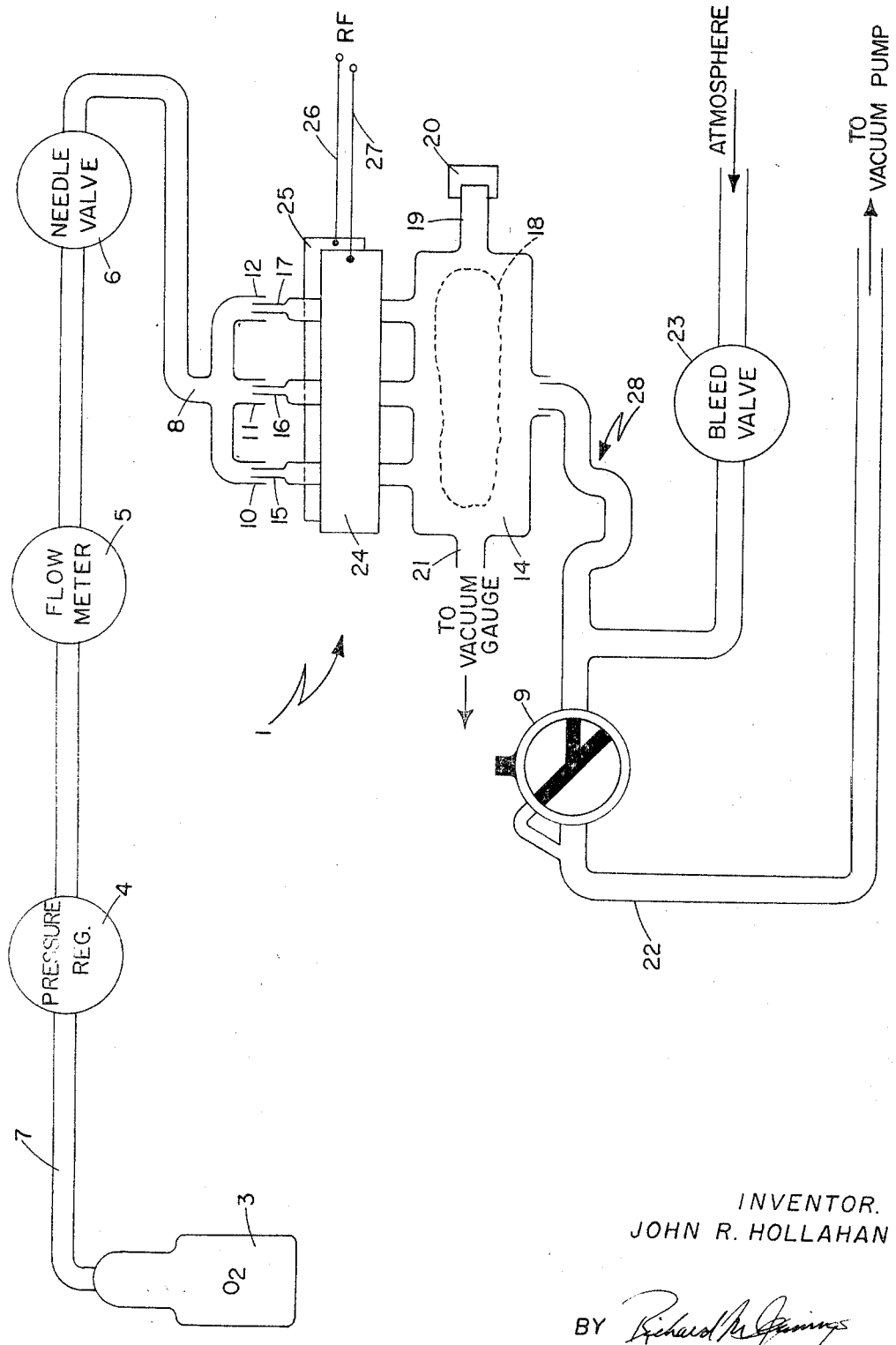

3,428,548
PLASMA REACTION SYSTEM FOR REACTING A GAS WITH A NON-GASEOUS MATERIAL
John R. Hollahan, Berkeley, Calif., assignor to Laboratory for Electronics, Inc., Boston, Mass., a corporation of Delaware
Filed Sept. 27, 1966, Ser. No. 582,442
U.S. Cl. 204—312         5 Claims
Int. Cl. B01k 1/00

This invention relates in general to the decomposition of non-gaseous materials and more particularly to the reacting of a non-gaseous material with a gaseous plasma.

The decomposition of non-gaseous materials into their elementary constituents is an important procedure in the field of chemical analysis. In order to perform a complete and accurate analysis, both quantitively and qualitatively, the process must be carried out without the introduction of contaminent substances or the inadvertent loss, partially or completely, of the sought after constituents. In co-pending application Ser. No. 524,103 of Richard M. Bersin, filed Feb. 6, 1966, and entitled, Gas Reaction System, there is disclosed a system for reacting a small quantity, relatively speaking, of a non-gaseous material with an ionized gas at low temperatures to decompose the former into its elemental constituents. By virtue of this process, undesired side reactions as well as inadvertent losses of desired constituents by volatility or diffusion into the walls of the reaction vessel are avoided. Generally speaking, the above mentioned system includes an L-shaped reaction vessel having a first chamber portion, horizontally orientated, to receive a non-gaseous material and a second chamber portion extending in an upward direction at a right angle from one end of the first chamber, for ionizing a gas, such as molecular oxygen. A multi-turn coil is wound around the second chamber portion to inductively couple an RF field to the oxygen as it passes through the chamber. The energy from the RF field is selectively transferred to the individual atoms of the oxygen to produce a continuous stream of ionized or activated gas. The non-gaseous material to be reacted is inserted into the first chamber portion at a point downstream from but sufficiently close to the RF field to avoid the recombination of the activated species before it reacts with the material. The activated oxygen flow (gas plasma) reacts with the non-gaseous substance to decompose the latter without substantially increasing the operating temperature. The resultant products together with unreacted ionized species of oxygen are withdrawn from the system through an outlet line by the action of an exhaust pump.

A severe limitation of the above discussed system lies in the size and number of non-gaseous materials which may be reacted in a single operation. This major deficiency cannot be alleviated by the mere volumetric enlargement of the material handling chamber alone. That is, the activated gas flow emanating from the RF field excitation chamber represents a relatively concentrated stream of ionized gas. The resultant plasma flow through the material handling chamber is thus limited to a rather narrowly defined area. In other words, the ionization of the gas passing through an enlarged material handling chamber is non-uniform. It follows that despite a substantial volumetric increase in the material handling chamber to accommodate larger non-gaseous samples, substantial reaction of the sample with activated gas occurs only in a relatively small area. As a result enlargement of the material handling chamber still leaves a major portion of a large non-gaseous sample unreacted.

In accordance with the present invention, which may be regarded as an improvement of the reaction system disclosed in the above identified patent application, a much larger sample of a non-gaseous material than heretofore possible may be completely reacted with an activated gas in a single operation. To this end, there is provided a reaction vessel including a first chamber adapted to receive a non-gaseous material and a plurality of second chambers for activating the gas arranged side by side and coupled to the first chamber. As inlet line is arranged to feed a molecular gas, such as oxygen, simultaneously to all the second chambers. An RF field is coupled to the gas to ionize it by means of a pair of capacitor plates disposed on opposite sides of the second chambers. The plurality of activation chambers are disposed along the top surface of the material handling chamber in an evenly spaced relationship to provide a uniform distribution of the ionized gas throughout the material handling chamber. An exhaust pump is operatively coupled to an orifice in the bottom surface of the material handling chamber by way of an outlet line to remove the unreacted oxygen species together with the resultant products. A cryogenic trap located in the outlet line between the exhaust pump and the material handling chamber filters out the unreacted gas species leaving the desired products.

Accordingly, a primary object of the present invention is the provision of an apparatus which provides a uniform distribution of an ionized gas throughout a material handling chamber.

A further object is the provision of a low temperature ashing system which allows greater flexibility in size, shape and quantity of materials that may be reacted in a single operation.

The novel features of the present invention together with further objects and advantages will become apparent from the following detailed description of a preferred embodiment when read in conjunction with the accompanying drawing in which:

The figure is an illustration in diagrammatic form of the reaction system in accordance with the principles of the present invention.

With reference now to the drawing it will be observed that reference numeral 1 designates, generally, a reaction vessel having three inlet orifices 10, 11 and 12 and an outlet orifice 13. A container 3 of molecular gas, such as oxygen, is coupled to reaction vessel 1 by way of a feed line 7. In the feed line 7 upstream from oxygen container 3 there is provided a pressure regulation valve 4. Of course, the pressure regulator valve 4 may be provided as an integral part of the oxygen container 3 as is usual in commercial containers of molecular gases. Also inserted into feed line 7 between oxygen container 3 and reaction vessel 1 are a needle valve 6 and a flow meter 5 to adjust the flow rate of gas through the system and to continually monitor the resultant flow rate, respectively. Feed line 7 branches out into three channels at a junction 8 to join reaction vessel 1 at inlet orifices 10, 11 and 12.

Reaction vessel 1 includes a first chamber 14 for holding a non-gaseous sample 18 and a plurality of second chambers 15, 16 and 17 for ionizing the oxygen. Both the first chamber and the second chambers are generally cylindrical in shape. A pair of capacitor plates 24 and 25 are disposed on opposite sides of and completely span the ionization chambers 15, 16 and 17 to couple an RF field to the oxygen as it passes through the various chambers. Although the illustrated embodiment shows capacitive coupling, it should be understood that inductive coupling may be used, if desired. The RF field is applied to capacitor plates 24 and 25 by means of a crystal controlled oscillator circuit (not shown) via braided shielded wires 26 and 27.

The material handling chamber 14 is provided with an opening 19 at one end thereof for inserting and removing the non-gaseous sample to be reacted. Opening 19 is provided with a closure in the form of a cap-like cover 20 which is fitted tightly over the opening 19 after the sample is inserted. Preferably, the non-gaseous sample is secured to a spit prior to insertion into the reaction vessel for ease of handling. Ionization chambers 15, 16 and 17 extend upwardly at right angles from the top surface of material handling chamber 14. To insure an even distribution of ionized gas throughout material handling chamber 14, the ionization chambers 15, 16 and 17 are equal in diameter and spaced apart an equal distance from each other in the axial direction along the top surface of chamber 14. Naturally, the diameter of generally cylindrical material handling chamber 14 is greater than the diameter of any one of the ionization chambers 15, 16 or 17.

Material handling chamber 14 is also provided with an outlet orifice 13 on its bottom surface and a small opening 21 at one end which is connected to a vacuum gauge (not shown) to continually measure the pressure within chamber 14. Outlet orifice 13 is connected to the atmosphere through a bleed valve 23 and to a vacuum pump by way of an outlet line 22. A control valve 9, which as shown diagrammatically has three positions, a full open position, partially open and fully closed, is inserted into outlet line 22. Also, downstream from outlet orifice 13 there is provided a catalytic chamber 28 formed of platinum or aluminum, to trap out unreacted species of oxygen.

In operation the system is initially pumped down by withdrawing air and residual gas from the reaction vessel 1 by way of the outlet orifice 13 of material handling chamber 14. The rate of pumpdown may be controlled by adjusting valve 9. For instance, if a fast pumpdown is desired the valve is set to a full open position. For a very slow pumpdown bleed valve 23 may be opened to by-passs output line 22 to the atmosphere.

After a desired pumpdown has been obtained the non-gaseous sample 18 is inserted into chamber 14 and the control valve 4 is opened to initiate a flow of oxygen through feed line 7 to reaction vessel 1. The oxygen flow simultaneously enters ionization chambers 15, 16 and 17 by way of inlet orifices 10, 11 and 12, respectively. The gas is then drawn through the respective ionization chambers, the material handling chamber 14, and the outlet line 22 by way of outlet orifice 13. To ionize or activate the oxygen, the RF oscillator (not shown) is activated to supply an RF field to the oxygen within the ionization chambers by means of capacitor plates 24 and 25. Typically, the oscillator provides a power output of around 300 watts at a frequency of 13 megacycles per second. In practice, capacitor plates 24 and 25 form a part of a resonant circuit which may be adjusted for maximum transfer of RF energy to the oxygen. That is, the impedance of the resonant circuit, which acts as a load on the RF oscillator, depends on the pressure in the ionization chambers as well as to some extent on the contents. Thus, by adjusting its overall impedance the resonant circuit may be finally tuned to optimize the power transfer to the gas for efficient operation.

The individual atoms of the oxygen absorb the energy supplied by the RF field to produce an ionized or activated oxygen flow. By this technique the gas may be ionized efficiently and at relatively low temperatures. The ionized gas flows out the ionization chambers into the material handling chamber 14 wherein it reacts with the non-gaseous material 18. It is significant to note that, inasmuch as the ionization chambers 15, 16 and 17 are evenly disposed along the top surface of chamber 14, there is provided an even distribution of ionized gas throughout the chamber 14. That is, by virtue of feeding an ionized gas from a plurality of chambers evenly distributed along the surface of the reacting chamber, a large sample, relatively speaking, of non-gaseous material may be uniformly reacted with the ionized gas. Moreover, the non-gaseous material is located at a point sufficiently close to the ionization chamber openings so that significant recombination of the ionized gas is unable to occur prior to reacting with the sample.

The volatile components produced by the reaction as well as unreacted oxygen are continuously removed from chamber 14 through the action of the exhaust pump. The trap 28 serves as a catalyst to recombine the unreacted species of oxygen into neutral unexcited oxygen molecules, thus, leaving the sought after constituents.

Although the invention has been described with reference to a preferred embodiment, it will be apparent, of course, that other modifications may be made within the scope contemplated by the invention. For instance, the number of ionization chambers is optional and depends somewhat on both the size of the material handling chamber and the size of the ionization chambers. Consequently, the invention herein described is to be construed to be limited only by the spirit and scope of the appended claims.

What is claimed is:

1. Apparatus for reacting a gas with a non-gaseous material at relatively low temperatures comprising a reaction vessel having a first chamber for receiving the non-gaseous material and a plurality of individual second chambers for activating the gas in immediate communication with said first chamber, means to induce a flow of gas simultaneously into said plurality of second chambers, means external of said reaction vessel to couple an RF field of sufficient intensity to ionize the gas within said plurality of second chambers, and exhaust means to withdraw the ionized gas from said plurality of second chambers by way of said first chamber to enable the non-gaseous material to be uniformly reacted with the ionized gas.

2. Apparatus as defined in claim 1 wherein said plurality of individual second chambers are evenly spaced in an axial direction along a surface of the first chamber to provide a uniform distribution of ionized gas throughout said first chamber.

3. Apparatus as defined in claim 2 wherein said RF field coupling means includes a pair of capacitor plates disposed on opposite sides of said plurality of second chambers.

4. Apparatus as defined in claim 2 wherein said first chamber and said plurality of individual second chambers are generally cylindrical in shape with the diameter of said first chamber being greater than the diameter of any one of the individual second chambers.

5. Apparatus as defined in claim 4 wherein said first chamber includes a removeable cap secured at one end thereof for inserting and removing the non-gaseous material.

References Cited

UNITED STATES PATENTS

| 2,660,559 | 11/1953 | Prime | 204—314 |
| 2,945,797 | 7/1960 | Cherrier | 204—312 |
| 3,040,250 | 6/1962 | Fuchs | 204—314 |
| 2,994,652 | 8/1961 | Frazer et al. | 204—312 |
| 3,049,488 | 8/1962 | Jackson et al. | 204—312 |

ROBERT K. MIHALEK, *Primary Examiner.*

U.S. Cl. X.R.

204—314